(12) United States Patent
Handa

(10) Patent No.: US 11,136,951 B2
(45) Date of Patent: Oct. 5, 2021

(54) GAS FUELING METHOD

(71) Applicant: HONDA MOTOR CO., LTD., Tokyo (JP)

(72) Inventor: Kiyoshi Handa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 133 days.

(21) Appl. No.: 16/197,671

(22) Filed: Nov. 21, 2018

(65) Prior Publication Data

US 2019/0153985 A1    May 23, 2019

(30) Foreign Application Priority Data

Nov. 22, 2017    (JP) .............................. JP2017-224596

(51) Int. Cl.
| | |
|---|---|
| *F02M 53/04* | (2006.01) |
| *G05D 7/06* | (2006.01) |
| *F02M 21/02* | (2006.01) |
| *B60L 50/70* | (2019.01) |

(52) U.S. Cl.
CPC .............. *F02M 53/04* (2013.01); *B60L 50/70* (2019.02); *F02M 21/0206* (2013.01); *G05D 7/0635* (2013.01); *H01M 2250/20* (2013.01)

(58) Field of Classification Search
CPC .... F02M 53/04; F02M 21/0206; B60L 50/70; B60L 58/33; B60L 2260/56; B60L 2240/662; G05D 7/0635; H01M 2250/20; Y02E 60/50; Y02E 60/32; Y02T 90/16; Y02T 10/72; Y02T 90/40
USPC .......................................................... 141/4
See application file for complete search history.

(56) References Cited

U.S. PATENT DOCUMENTS

| | | | | |
|---|---|---|---|---|
| 7,406,987 B2 * | 8/2008 | Takano | .................... | F17C 5/007 |
| | | | | 141/82 |
| 8,662,115 B2 * | 3/2014 | Mori | ................. | H01M 8/04089 |
| | | | | 141/94 |
| 8,708,005 B2 * | 4/2014 | Mori | ........................ | F17C 5/007 |
| | | | | 141/197 |

(Continued)

OTHER PUBLICATIONS

Handa et al., "Development of MC Formula Hydrogen Refueling Method for FCV", Summarized paper for Autumn Congress (2015), Society of Automotive Engineers of Japan, Inc. with concise explanation of relevance, Cited in Specification, (6 pages).

*Primary Examiner* — Timothy L Maust
*Assistant Examiner* — James R Hakomaki
(74) *Attorney, Agent, or Firm* — Westerman, Hattori, Daniels & Adrian, LLP

(57) ABSTRACT

In order to provide a gas fueling method capable of suppressing overheating of a tank immediately after a start of fueling, in the gas fueling method, an accumulator and a hydrogen tank are coupled to each other with a gas flow passage. In a main fueling control at and after the timing t2, a sensor-based value MAT of a temperature parameter of a measurement position Q1 is calculated on the basis of a detection value of a first station temperature sensor, and the fueling control is performed on the basis of the sensor-based value MAT. In an initial fueling control at the timing t0 to t2, a prediction value MAT_pred of the temperature parameter is calculated at the timing t2 on the basis of an ambient temperature value, a mass flow rate value, and a heat capacity. The fueling control is performed on the basis of the prediction value MAT_pred.

7 Claims, 11 Drawing Sheets

(56) References Cited

U.S. PATENT DOCUMENTS

| | | | | |
|---|---|---|---|---|
| 9,279,541 B2* | 3/2016 | Cohen | ............ | F17C 7/00 |
| 2010/0307636 A1* | 12/2010 | Uemura | ............ | F17C 5/06 |
| | | | | 141/4 |
| 2012/0205003 A1* | 8/2012 | Okawachi | ............ | F17C 5/00 |
| | | | | 141/95 |
| 2013/0052557 A1* | 2/2013 | Okawachi | ............ | F17C 1/06 |
| | | | | 429/444 |
| 2014/0290790 A1* | 10/2014 | Mathison | ............ | F17C 5/007 |
| | | | | 141/4 |
| 2014/0332114 A1* | 11/2014 | Nagura | ............ | F17C 13/025 |
| | | | | 141/4 |
| 2014/0377678 A1* | 12/2014 | Tsukagoshi | ............ | G05D 7/0635 |
| | | | | 429/425 |
| 2015/0184804 A1* | 7/2015 | Handa | ............ | F17C 13/026 |
| | | | | 141/1 |
| 2015/0362383 A1* | 12/2015 | Komiya | ............ | G01K 15/005 |
| | | | | 702/99 |
| 2016/0305611 A1* | 10/2016 | Handa | ............ | F17C 13/023 |
| 2017/0237094 A1* | 8/2017 | Ojima | ............ | H01M 8/04067 |
| | | | | 429/434 |

* cited by examiner

GAS FUELING METHOD

This application is based on and claims the benefit of priority from Japanese Patent Application No. 2017-224596, filed on 22 Nov. 2017, the content of which is incorporated herein by reference.

BACKGROUND OF THE INVENTION

Field of the Invention

The present invention relates to a gas fueling method. More specifically, the present invention relates to a gas fueling method for coupling a gas supply source and a tank of a mobile object to each other with a gas flow passage provided with a cooling device and fueling the tank with the gas cooled by the cooling device.

Related Art

A fuel cell vehicle travels by supplying an oxygen containing air and a hydrogen gas as a fuel gas to a fuel cell and driving an electric motor using power generated thereby. In recent years, practical application of fuel cell vehicles using such a fuel cell as an energy source for generating power has been progressed. While the hydrogen gas is necessary to generate power using the fuel cell, in recent years, fuel cell vehicles in which a sufficient amount of the hydrogen gas is stored in advance in a high-pressure tank or a hydrogen tank provided with storage alloy, and the hydrogen gas in the tank is used during a travel are employed in many cases. Accordingly, researches on a fueling technology for rapidly fueling the tank with the hydrogen gas as much as possible have been actively progressed.

The hydrogen gas generates heat by compression inside the tank. For this reason, recently, in order to suppress a temperature increase inside the tank during fueling of the hydrogen gas, a technology for cooling the hydrogen gas to approximately −40° C. using a pre-cooler provided in a flow passage of the hydrogen gas has been focused.

For example, Non-patent Document 1 discusses a fueling method for supplying the hydrogen gas while changing a compression rate on the basis of a predetermined formula during the fueling. In the fueling method discussed in Non-patent Document 1, the compression rate changes depending on a temperature parameter obtained by applying mass averaging processing to a detection value of a temperature sensor provided in a downstream side of the pre-cooler in the middle of the hydrogen gas flow passage.

FIG. 11 is a diagram illustrating a temporal change of the temperature detected by the temperature sensor immediately after a start of fueling. As illustrated in FIG. 11, the temperature sensor indicates an external air temperature at the fueling start timing. After several tens of seconds, the temperature decreases to a cooling temperature of the pre-cooler, and the temperature sensor then indicates a generally constant temperature. In this manner, time is delayed in the fueling disadvantageously if temperature parameter value is calculated by directly using the detection value of the temperature sensor to determine the compression rate for several tens of seconds from the start of the fueling.

In this regard, in the fueling method of Non-patent Document 1, instead of the detection value of the temperature sensor, a predetermined fixed value is employed as the temperature parameter value for determining the compression rate during several tens of seconds (specifically, for example, 30 seconds) from the start of fueling. Here, a value considered to be finally reached during the fueling is employed as the fixed value. When several tens of seconds elapses from the start of fueling, and it becomes possible to use the detection value of the temperature sensor, the fueling is continuously performed by switching the temperature parameter value from the fixed value to a value calculated from the detection value of the temperature sensor.

Non-Patent Document 1: "Development of MC Formula Hydrogen Refueling Method for FCV", by Kiyoshi HANDA and Steve MATHISON, Transactions of Society of Automotive Engineers of Japan, 2015 Autumn Congress

SUMMARY OF THE INVENTION

As described in the fueling method of Non-patent Document 1, it is possible to improve the fueling speed immediately after the start of fueling by using the fixed value as the temperature parameter for several tens of seconds from the start of fueling. However, if there is a problem in the pre-cooler, it may be difficult to sufficiently lower the temperature of the hydrogen gas using the pre-cooler. In this case, as illustrated in FIG. 12, when it is possible to use the detection value of the temperature sensor at the timing t1 from the start of fueling of the timing t0, the temperature parameter value used in the fueling control is switched from the fixed value of the timing t1 to a value directly calculated from the detection value of the temperature sensor. In this case, there is a significant difference. As a result, the hydrogen tank may be overheated over an anticipated temperature.

In the fueling method of Non-patent Document 1, the temperature parameter value is calculated using a temperature sensor provided in the vicinity of a break-away coupling between the pre-cooler and the nozzle. However, the temperature of the hydrogen gas cooled by the pre-cooler increases by the external air in the course of reaching the hydrogen tank of a vehicle through a hose. For this reason, in order to suitably determine the compression rate depending on an actual temperature of the hydrogen gas supplied to the hydrogen tank, the temperature sensor is preferably provided as close as possible to a vehicle, in other words, as far as possible from the pre-cooler (that is, a position closer to the nozzle relative to the break-away coupling). However, if the temperature sensor is provided far from the pre-cooler, time necessary to sufficiently lower the temperature detected by the temperature sensor immediately after the start of fueling of the hydrogen gas inevitably increases, so that the period of time for which the fixed value is used as described above may increase disadvantageously. Therefore, if the fueling is performed using the erroneous fixed value as described above, the hydrogen tank may be further overheated.

An object of the invention is to provide a gas fueling method capable of suppressing overheating in a tank immediately after the start of fueling.

(1) According to an aspect of the invention, there is provided a gas fueling method between a gas supply source (for example, an accumulator 91 described below) and a tank (for example, a hydrogen tank 31 described below) of a mobile object (for example, a fuel cell vehicle V described below) coupled to each other with a gas flow passage (for example, a station pipe 81, an external hose 82, and a joint portion 83 described below) provided with a cooling device (for example, a pre-cooler 96 described below) and a flow rate regulator (for example, a flow rate control valve 84 described below) to perform a fueling control on the basis of a temperature parameter at a first predetermined position (for example, a measurement position Q1 or Q1' described below) of the gas flow passage, the gas fueling method including: a process for acquiring an ambient temperature, a mass flow rate of a gas flowing through the gas flow passage, and a gas temperature value or a temperature value relating to the gas at a second predetermined position (for example, a measurement position Q2 or Q2') in an upstream side of the first predetermined position in the middle of the gas flow passage (for example, S24 of FIG. 5, S34 of FIGS. 6, S45 and S49 of FIG. 8, and the like as described below); and a process for predicting a value of the temperature parameter after a prediction time for a case where gas fueling is continuously performed from a current timing to the prediction time or later on the basis of a heat capacity from the first predetermined position to the second predetermined position, the acquired ambient temperature value, the acquired mass flow rate value, and the acquired temperature value (for example, S25 of FIG. 5, S36 of FIGS. 6, S46 and S50 of FIG. 8, and the like as described below), in which a fueling control is performed on the basis of the prediction value of the temperature parameter.

(2) In this case, preferably, the gas fueling method further includes a process for calculating a value of the temperature parameter on the basis of a detection value of a first gas temperature sensor (for example, first station temperature sensors 89 and 89A described below) provided in the first predetermined position and the acquired mass flow rate value after the prediction time elapses (for example, S11 of FIG. 3 described below), in which a fueling control is performed on the basis of the prediction value of the temperature parameter until the prediction time elapses, a fueling control is performed on the basis of a calculation value of the temperature parameter after the prediction time elapses, and the prediction time changes depending on the acquired mass flow rate value.

(3) In this case, preferably, the prediction time is set to be longer in a case where the acquired mass flow rate value is lower than a predetermined value, compared to a case where the acquired mass flow rate value is higher than the predetermined value.

(4) According to another aspect of the invention, there is provided a gas fueling method between a gas supply source (for example, an accumulator 91 described below) and a tank (for example, a hydrogen tank 31 described below) of a mobile object (for example, a fuel cell vehicle V described below) coupled to each other with a gas flow passage (for example, a station pipe 81, an external hose 82, and a joint portion 83 described below) provided with a cooling device (for example, a pre-cooler 96 described below) and a flow rate regulator (for example, a flow rate control valve 84 described below) to perform a fueling control on the basis of a temperature parameter at a first predetermined position (for example, a measurement position Q1 or Q1' described below) of the gas flow passage, the gas fueling method including: a first process (for example, S45 of FIG. 8 described below) for acquiring an ambient temperature, a mass flow rate of a gas flowing through the gas flow passage, and a gas temperature or a temperature value relating to the gas at a second predetermined position (for example, a measurement position Q2 or Q2') in an upstream side of the first predetermined position in the middle of the gas flow passage; a second process (for example, S46 of FIG. 8 described below) for predicting a value of the temperature parameter at a prediction timing for a case where gas fueling is continuously performed from a current timing to the future prediction timing on the basis of a heat capacity from the first predetermined position to the second predetermined position, the acquired ambient temperature value, the acquired mass flow rate value, and the acquired temperature value; and a third process (for example, S47 of FIG. 8 described below) for performing a fueling control on the basis of the prediction value of the temperature parameter for a predetermined period of time from the current timing, in which the first to third processes are executed repeatedly two or more times until the prediction timing.

(5) In this case, preferably, the gas flow passage has a first pipe (for example, a station pipe 81 described below) extending from the supply source, a second pipe (for example, an external hose 82 described below) extending from a nozzle portion (for example, a fueling nozzle 92 described below) coupled to a receptacle (for example, a receptacle 38 described below) of the mobile object, and a joint portion (for example, a joint portion 83 described below) that couples the first and second pipes to each other, the cooling device is provided in the first pipe, the first predetermined position is set in the nozzle portion or between the nozzle portion and the joint portion (for example, a measurement position Q1 described below), and the second predetermined position is set in the joint portion, in the cooling device, or between the joint portion and the cooling device (for example, a measurement position Q2 described below).

(6) In this case, preferably, the gas flow passage has a first pipe (for example, a station pipe 81 described below) extending from the supply source, a second pipe (for example, an external hose 82 described below) extending from a nozzle portion (for example, a fueling nozzle 92 described below) coupled to a receptacle (for example, a receptacle 38 described below) of the mobile object, and a joint portion (for example, a joint portion 83 described below) that couples the first and second pipes to each other, the cooling device is provided in the first pipe, the first predetermined position is set in the joint portion or between the joint portion and the cooling device (for example, a measurement position Q1' described below), and the second predetermined position is set in the cooling device or between the first predetermined position and the cooling device (for example, a measurement position Q2' described below).

(1) In the gas fueling method according to the invention, the fueling control is performed on the basis of the temperature parameter defined at the first predetermined position of the gas flow passage. In particular, according to the invention, an ambient temperature, a mass flow rate, and a gas temperature or a temperature value relating to a gas at the second predetermined position in the upstream side of the first predetermined position are acquired. A temperature parameter value after a prediction time for a case where gas fueling is continuously performed after the prediction time elapses from the current timing is predicted on the basis of a heat capacity from the first predetermined position to the second predetermined position, the acquired ambient temperature value, the acquired mass flow rate value, and the acquired gas temperature value. In addition, the fueling control is performed on the basis of this temperature parameter prediction value. As a result, for example, even when it is difficult to directly calculate the temperature parameter value using the first gas temperature sensor provided in the first predetermined position far from the cooling device relative to the second predetermined position from the current timing immediately after the start of the fueling to the prediction time or later, it is possible to calculate the prediction value of the temperature parameter from the current timing to the prediction time or later and perform the fueling control on the basis of this prediction value. Therefore, for example, even when the temperature parameter value used in the fueling control is switched from the aforementioned prediction value to the value directly calculated from the detection value of the first gas temperature sensor in response to a state in which the temperature parameter value can be directly calculated using the first gas temperature sensor after the prediction time, it is possible to reduce a difference between the two values. Therefore, it is possible to suppress unnecessary overheating of the tank immediately after the start of the fueling.

(2) In the gas fueling method according to the invention, the fueling control based on the prediction value of the temperature parameter calculated from the gas temperature of the second predetermined position is performed until the prediction time elapses. After the prediction time elapses, the fueling control is switched to a fueling control based on a calculation value of the temperature parameter based on the detection value of the first gas temperature sensor provided in the first predetermined position. Here, in the gas fueling method according to the invention, the prediction time changes depending on the acquired mass flow rate value. Therefore, it is possible to determine the timing for switching the fueling control depending on an actual fueling condition.

(3) It is conceived that, if the gas mass flow rate is low, influence of the heat mass in the pipe increases, and it is difficult to lower the gas temperature, and a risk of overheating in the tank increases. In this regard, in the gas fueling method according to the invention, in a case where the acquired mass flow rate value is lower than a predetermined value, it is determined that the tank is more easily overheated, compared to a case where the acquired value is higher than the predetermined value. Then, the prediction time is lengthened. That is, the timing for switching the fueling control is delayed. As a result, it is possible to switch the fueling control at the timing suitable for an actual fueling condition.

(4) The gas fueling method according to the invention includes a first process for acquiring an ambient temperature, a mass flow rate, and a gas temperature value at a second predetermined position, a second process for predicting a temperature parameter value at a prediction timing for a case where gas fueling is continuously performed from the current timing to the future prediction timing on the basis of the heat capacity, the acquired ambient temperature value, the acquired mass flow rate value, and the acquired gas temperature value, and a third process for performing the fueling control on the basis of the temperature parameter prediction value. The first to third processes are repeated two or more times until the prediction timing. In this manner, there are several chances to predict the temperature parameter value until the prediction timing. Therefore, it is possible to approximate the temperature parameter prediction value to a suitable value, that is, a value directly calculated from the detection value of the first gas temperature sensor in a stepwise manner. Accordingly, it is possible to further suppress overheating of the tank immediately after the start of the fueling.

(5) As described in the paragraph (2), the fueling control may be performed using the temperature parameter value calculated from the detection value of the first gas temperature sensor provided in the first predetermined position after the prediction time elapses in some cases. In the gas fueling method according to the invention, the first predetermined position used to define the temperature parameter is set in the nozzle portion closest to the mobile object or between the nozzle portion and the joint portion in the middle of the gas flow passage. Therefore, according to the invention, after the prediction time elapses, the fueling control can be performed using the temperature parameter corresponding to an actual temperature of the gas supplied to the tank on the basis of the temperature parameter value calculated from the detection value of the first gas temperature sensor provided in the nozzle portion or between the nozzle portion and the joint portion.

(6) In the gas fueling method according to the invention, the first predetermined position used to define the temperature parameter is set in the joint portion or between the joint portion and the cooling device in the middle of the gas flow passage. In many stations of the related art, the gas temperature sensor is provided in the joint portion or between the joint portion and the cooling device. Therefore, the invention can be applied just by adding a small equipment change to the existing station by setting the first predetermined position in this position.

DETAILED DESCRIPTION OF THE INVENTION

First Embodiment

Figure 1:
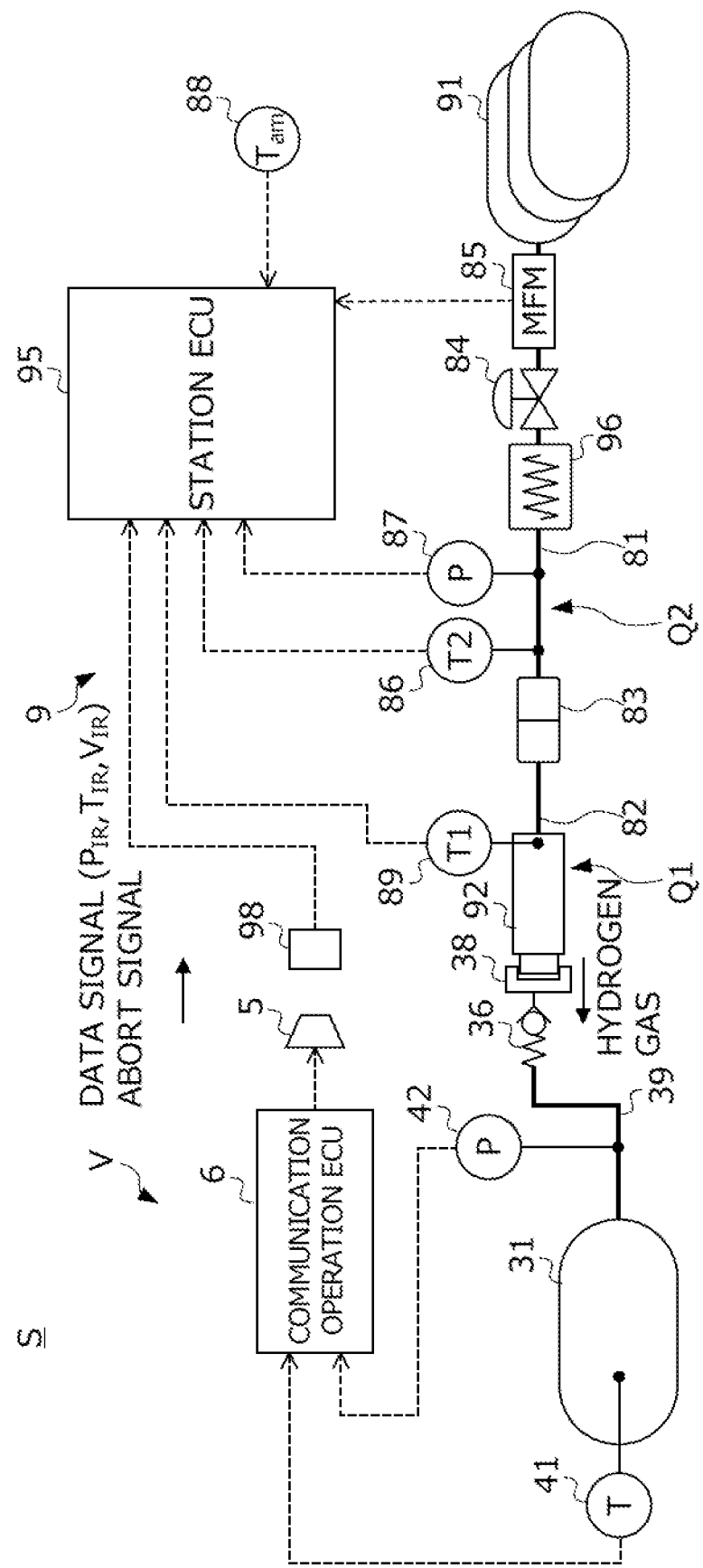
FIG. 1 is a diagram illustrating a configuration a hydrogen fueling system based on a gas fueling method according to a first embodiment of the invention.

A first embodiment of the invention will now be described with reference to the accompanying drawings. FIG. 1 is a diagram illustrating a configuration of a hydrogen fueling system S based on a gas fueling method according to this embodiment. The hydrogen fueling system S is formed by combining a fuel cell vehicle V that travels by using a hydrogen gas as a fuel gas and a hydrogen station 9 that supplies the hydrogen gas to the hydrogen tank of the vehicle V. Hereinafter, first, a configuration of the vehicle V will be described. Subsequently, a configuration of the hydrogen station 9 will be described.

The vehicle V includes a hydrogen tank 31 that stores a hydrogen gas supplied from the hydrogen station 9, a vehicle pipe 39 extending from the hydrogen tank 31, a fuel cell system (not illustrated) that generates power using the hydrogen gas stored in the hydrogen tank 31 to drive the vehicle V using the generated power, an infrared (IR) communication unit 5 that transmits a data signal regarding the hydrogen tank 31 to the hydrogen station 9, and a communication/operation ECU 6 that generates a data signal transmitted from the IR communication unit 5.

The vehicle pipe 39 includes a receptacle 38 where a fueling nozzle 92 of the hydrogen station 9 described below is fitted, and a check valve 36 provided in the vicinity of the receptacle 38 in the middle of the vehicle pipe 39 to prevent a reverse flow of the hydrogen gas from the hydrogen tank 31 side to the receptacle 38.

As means for acquiring information regarding the hydrogen tank 31 described above, an internal tank temperature sensor 41 and an internal tank pressure sensor 42 are coupled to the communication/operation ECU 6. The internal tank temperature sensor 41 detects a temperature of the hydrogen gas inside the hydrogen tank 31 and transmits a signal corresponding to the detection value to the communication/operation ECU 6. The internal tank pressure sensor 42 detects a pressure inside the hydrogen tank 31 and transmits a signal corresponding to the detection value to the communication/operation ECU 6.

The communication/operation ECU 6 is a microcomputer including an interface for performing analog-to-digital (A/D) conversion for the detection signal of the sensors 41 and 42, a central processing unit (CPU) for executing a signal generating processing described below, a driving circuit for driving the IR communication unit 5 as determined in the processing, a memory device for storing various types of data, or the like.

The memory device of the communication/operation ECU 6 records a program relating to execution of a data signal generating processing described below, or specific information including a volumetric capacity value of the hydrogen tank 31 mounted at the time of manufacturing of the vehicle V. In addition to the volumetric capacity value of the hydrogen tank, for example, the unique information includes, for example, information regarding the hydrogen tank 31 that can be specified at the time of manufacturing, such as a capacity derived from the volumetric capacity value on the basis of an existing conversion rule, or a material of the hydrogen tank.

The CPU of the communication/operation ECU 6 starts a signal generating processing for generating a signal to be transmitted from the IR communication unit 5 to the hydrogen station 9, for example, as a fuel lid for protecting the receptacle 34 is opened. The CPU of the communication/operation ECU 6 terminates the signal generating processing, for example, when it is difficult to perform the fueling of the hydrogen gas by closing the fuel lid.

In the signal generating processing, a temperature transmit value $T_{IR}$ corresponding to the current internal hydrogen tank temperature value, a pressure transmit value $P_{IR}$ corresponding to the current internal hydrogen tank pressure value, and a volumetric capacity transmit value $V_{IR}$ corresponding to the current hydrogen tank volumetric capacity value are acquired at every predetermined period, and data signals corresponding to these values ($T_{IR}$, $P_{IR}$, and $V_{IR}$) are generated. As the temperature transmit value $T_{IR}$, a detection value of the internal tank temperature sensor 41 at that time is employed. As the pressure transmit value $P_{IR}$, a detection value of the internal tank pressure sensor 42 at that time is employed. As the volumetric capacity transmit value $V_{IR}$, a value recorded in the aforementioned memory device is employed.

In the signal generating processing, the temperature transmit value $T_{IR}$ and the pressure transmit value $P_{IR}$ acquired periodically as described above are compared with an abort threshold value predetermined for each transmit value. In a case where any one of these transmit values exceeds the abort threshold value during the fueling, an abort signal for requesting termination of the fueling to the hydrogen station 9 is generated.

A driving circuit of the communication/operation ECU 6 drives (turns on or off) the IR communication unit 5 in response to the data signal or the abort signal generated by the signal generating processing. As a result, the data signal or abort signal including condition information regarding a condition of the inside of the hydrogen tank (such as the temperature transmit value $T_{IR}$ and the pressure transmit value $P_{IR}$) and specific information (such as the volumetric capacity transmit value $V_{IR}$) is transmitted to the hydrogen station 9.

The hydrogen station 9 includes an accumulator 91 where a hydrogen gas to be supplied to the vehicle V is stored in a high pressure, a station pipe 81 extending from the accumulator 91, an external hose 82 extending from the fueling nozzle 92, a joint portion 83 that couples the external hose 82 to the station pipe 81 to form a single flow passage, a pre-cooler 96 and a flow rate control valve 84 provided in the station pipe 81, and a station ECU 95 that controls the flow rate control valve 84.

After the fueling nozzle 92 is coupled to the receptacle 38 provided in the vehicle V, the station ECU 95 executes a fueling control for fueling the hydrogen tank 31 of the vehicle V with the high-pressure hydrogen gas stored in the accumulator 91 by adjusting an opening level of the flow rate control valve 84 depending on a sequence described below with reference to FIGS. 2 to 5.

The joint portion 83 is a so-called break-away coupling. That is, the joint portion 83 is a coupler having a function of disconnecting the external hose 82 and the station pipe 81 while preventing leakage of the hydrogen gas in the accumulator 91 side when a strong tension is generated in the external hose 82.

The pre-cooler 96 is provided closer to the joint portion 83 side relative to the flow rate control valve 84 in the middle of the station pipe 81. The pre-cooler 96 has a heat exchanger for promoting a heat exchange between a refrigerant (not illustrated) and the hydrogen gas flowing through the station pipe 81. Using this heat exchanger, the hydrogen gas decompressed by the flow rate control valve 84 is cooled to a predetermined cooling temperature (for example, approximately −40° C.)

Various sensors 85, 86, 87, 88, and 89 are coupled to the station ECU 95 in order to check a condition of the hydrogen gas flowing through the station pipe 81.

A mass flowmeter 85 is provided between the accumulator 91 and the pre-cooler 96 in the middle of the station pipe 81 to transmit a mass per unit time of the hydrogen gas flowing through the station pipe 81, that is, a signal corresponding to a mass flow rate to the station ECU 95. The mass flow rate value of the hydrogen gas during the fueling is acquired by the station ECU 95 on the basis of the detection value of the mass flowmeter 85.

A first station temperature sensor 89 is provided in a fueling nozzle 92 which is a part of the station pipe 81 closest to the vehicle to transmit a signal corresponding to the temperature of the hydrogen gas in the fueling nozzle 92 to the station ECU 95. In this embodiment, a position of the fueling nozzle 92 where the first station temperature sensor 89 is provided will be defined as a measurement position Q1. A gas temperature value of this measurement position Q1 is acquired by the station ECU 95 on the basis of a detection value of the first station temperature sensor 89.

A second station temperature sensor 86 is provided in a measurement position Q2 set in an upstream side of the measurement position Q1 in the middle of the station pipe 81. More specifically, the second station temperature sensor 86 is provided in a certain measurement position Q2 between the joint portion 83 and the pre-cooler 96 in the middle of the station pipe 81 to transmit a signal corresponding to the hydrogen gas temperature of the measurement position Q2 to the station ECU 95. In this measurement position Q2, the gas temperature value is acquired by the station ECU 95 on the basis of the detection value of the second station temperature sensor 86. As described below, in the station ECU 95, the gas temperature value of the measurement position Q1 may be estimated on the basis of the detection value of the second station temperature sensor 86 provided in the measurement position Q2 in the upstream side thereof.

A station pressure sensor 87 is provided in the measurement position Q2 to transmit a signal corresponding to the pressure of the hydrogen gas in the measurement position Q2 to the station ECU 95. An external air temperature sensor 88 detects a temperature of the external air and transmits a signal corresponding to the detection value to the station ECU 95. The ambient temperature value during fueling is acquired by the station ECU 95 on the basis of the detection value of the external air temperature sensor 88.

The fueling nozzle 92 is provided with an IR communication unit 98 for communication with the vehicle V. As the fueling nozzle 92 is coupled to the receptacle 38, the IR communication unit 98 is paired with the IR communication unit 5 provided in the vehicle V, so that data signal transmit/receive operations using infrared rays between these communication units 98 and 5 become available.

Figure 2:
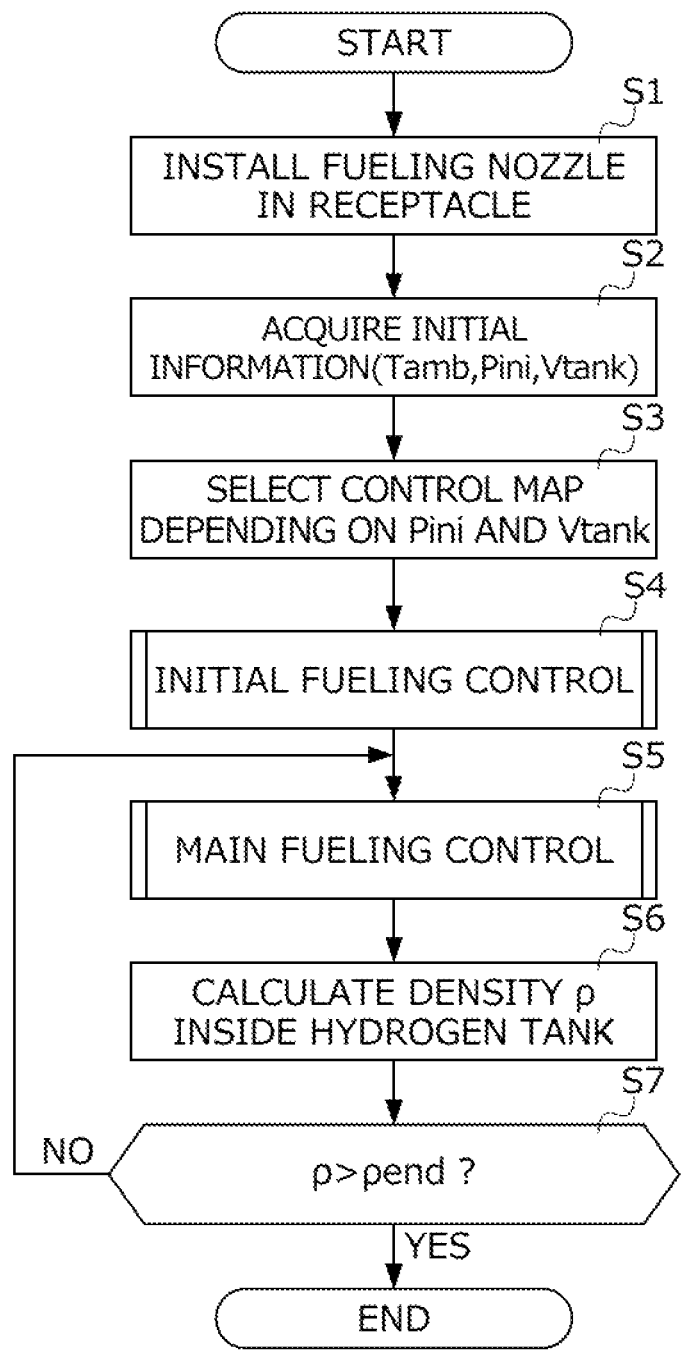
FIG. 2 is a flowchart illustrating a specific sequence of the gas fueling method.

FIG. 2 is a flowchart illustrating a specific sequence of the gas fueling method for supplying a hydrogen gas to the hydrogen tank 31 by coupling the accumulator 91 of the hydrogen station 9 and the hydrogen tank 31 of the vehicle V to each other with the pipes 81 and 82. As illustrated in FIG. 2, the gas fueling method according to this embodiment is generally divided into an initial fueling control executed at an initial stage and a main fueling control executed after the initial fueling control.

First, in S1, an operator installs the fueling nozzle 92 of the hydrogen station 9 in the receptacle 38 of the vehicle V to couple the accumulator 91 of the hydrogen station 9 and the hydrogen tank 31 of the vehicle V to each other with a piping including the station pipe 81, the joint portion 83, the external hose 82, the fueling nozzle 92, and the vehicle pipe 39.

Then, in S2, the station ECU 95 acquires information necessary to execute the fueling control. More specifically, the station ECU 95 acquires a current ambient temperature value Tamb, an initial pressure value Pini as the current internal pressure of the hydrogen tank 31 (immediately before starting fueling), and a volumetric capacity value Vtank of the currently coupled hydrogen tank 31. Note that the ambient temperature value Tamb is acquired by the station ECU 95 on the basis of the detection value of the external air temperature sensor 88, and the initial pressure value Pini and the volumetric capacity value Vtank are acquired by the station ECU 95 on the basis of a data signal transmitted from the vehicle V via communication between the vehicle V and the hydrogen station 9.

Then, in S3, the station ECU 95 selects one control map corresponding to the values Pini and Vtank acquired in S2 out of a group of predetermined control maps. This control map is to associate the ambient temperature value Tamb with a plurality of coefficient values (a, b, c, and d) used to characterize a modeling formula used to set the target compression rate in the initial fueling and the main fueling as described below. A plurality of control maps are stored in the recording medium of the station ECU 95 depending on a combination of the tank volumetric capacity and the tank initial pressure. In S3, the station ECU 95 selects a control map depending on the values Pini and Vtank acquired in S2.

Then, in S4, the station ECU 95 executes the initial fueling control described below in details with reference to FIG. 5 until a switching time tsw (specifically, for example, thirty seconds) described below elapses from the start of the fueling.

Figure 3:
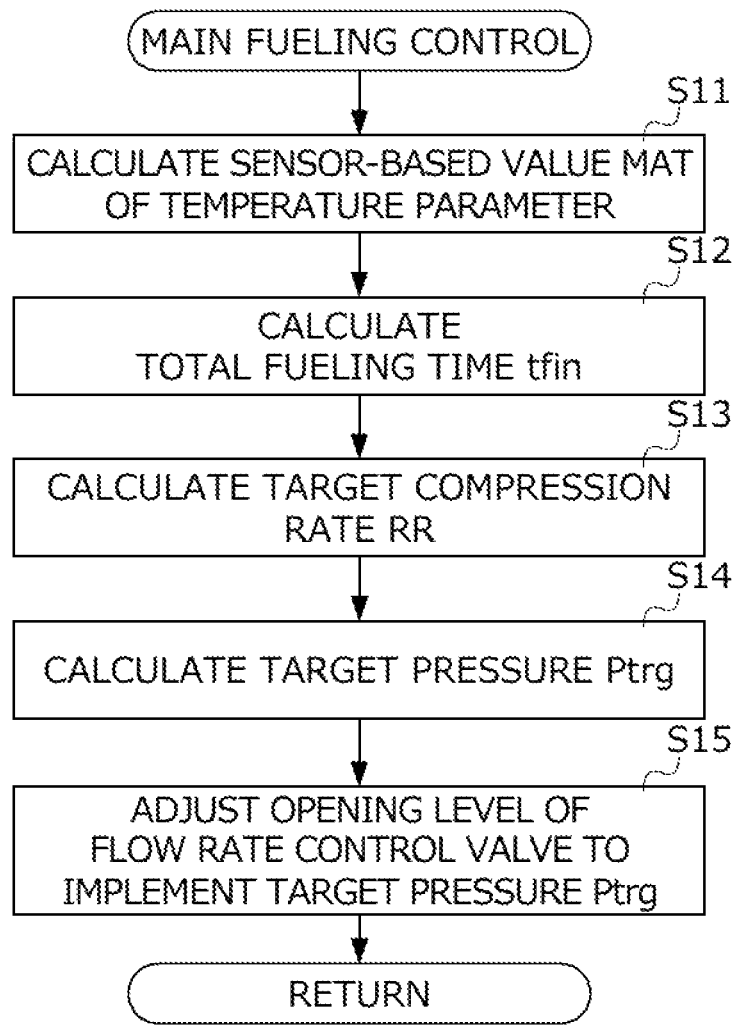
FIG. 3 is a flowchart illustrating a specific sequence of a main fueling control.

Then, in S5, the station ECU 95 executes the main fueling control, and advances to S6. FIG. 3 is a flowchart illustrating a specific sequence of the main fueling control.

In S11, the station ECU 95 acquires a gas temperature value T1 at the measurement position Q1 on the basis of the detection value of the first station temperature sensor 89, and applies a mass averaging processing based on the mass flow rate value m indicated in the formula (1) described below to this temperature value T1 to calculate the temperature parameter value. In the following formulas, "i" and "j" denote integers representing control steps. In addition, in the following formulas, a value acquired in the control step "i" will be parenthesized. Furthermore, in the following formula (1), "s" denotes a predetermined integer representing a control step for starting the mass averaging processing. Moreover, in the following description, a temperature parameter value calculated based on the following formula (1) using the temperature value T1 acquired at the measurement position Q1 on the basis of the detection value of the first station temperature sensor 89 as described above will be referred to as a "sensor-based value of the temperature parameter" and will be abbreviated as "MAT".

$$MAT(i) = \frac{\sum_{j=s}^{i}[(m(j)-m(j-1))\times 0.5(T1(j)+T1(j-1))]}{\sum_{j=s}^{i}(m(j)-m(j-1))} \quad (1)$$

In S12, the station ECU 95 determines the coefficient values (a, b, c, and d) by searching the control map selected in advance on the basis of the ambient temperature value Tamb, and calculates a total fueling time value tfin by inputting the coefficient values (a, b, c, and d) and the sensor-based values MAT of the temperature parameter calculated in S11 to the following formula (2). Here, the "total fueling time" refers to time expected to be taken from the start of the fueling at the initial pressure to the termination of the fueling as the hydrogen tank 31 is fully fueled.

$$tfin = a \times MAT^3 + b \times MAT^2 + c \times MAT + d \quad (2)$$

In S13, the station ECU 95 calculates a target compression rate value RR for implementing this process on the basis of the total fueling time value tfin calculated in S12.

In S14, the station ECU 95 acquires the gas pressure value P at the measurement position Q2 and calculates a target pressure value Ptrg corresponding to a target value of the gas pressure at the measurement position Q2 by adding the target compression rate value RR calculated in S13 to this gas pressure value P (Ptrg=P+RR). Here, the gas pressure value P is acquired by the station ECU 95 on the basis of the detection value of the station pressure sensor 87.

In S15, the station ECU 95 adjusts an opening level of the flow rate control valve 84 depending on an existing feedback control rule using the detection value of the station pressure sensor 87 to implement the calculated target pressure value Ptrg, and returns to S6.

Returning to FIG. 2, in S6, the station ECU 95 acquires a current internal gas temperature value Tgas of the hydrogen tank 31 and a gas pressure value P of the measurement position Q2 and calculates an internal hydrogen gas density value ρ of the hydrogen tank 31 on the basis of the gas temperature value Tgas and the gas pressure value P. Here, the gas temperature value Tgas is acquired by the station ECU 95 on the basis of the data signal transmitted from the vehicle V via communication between the vehicle V and the hydrogen station 9.

In S7, the station ECU 95 determines whether or not the density value ρ calculated in S6 is higher than a predetermined fueling termination density value ρend. If it is determined NO in S7, the station ECU 95 returns to S5 and continuously executes the main fueling control. If it is determined YES in S7, the station ECU 95 determines that the hydrogen tank 31 is fully fueled, and terminates the processing of FIG. 2.

Figure 4:
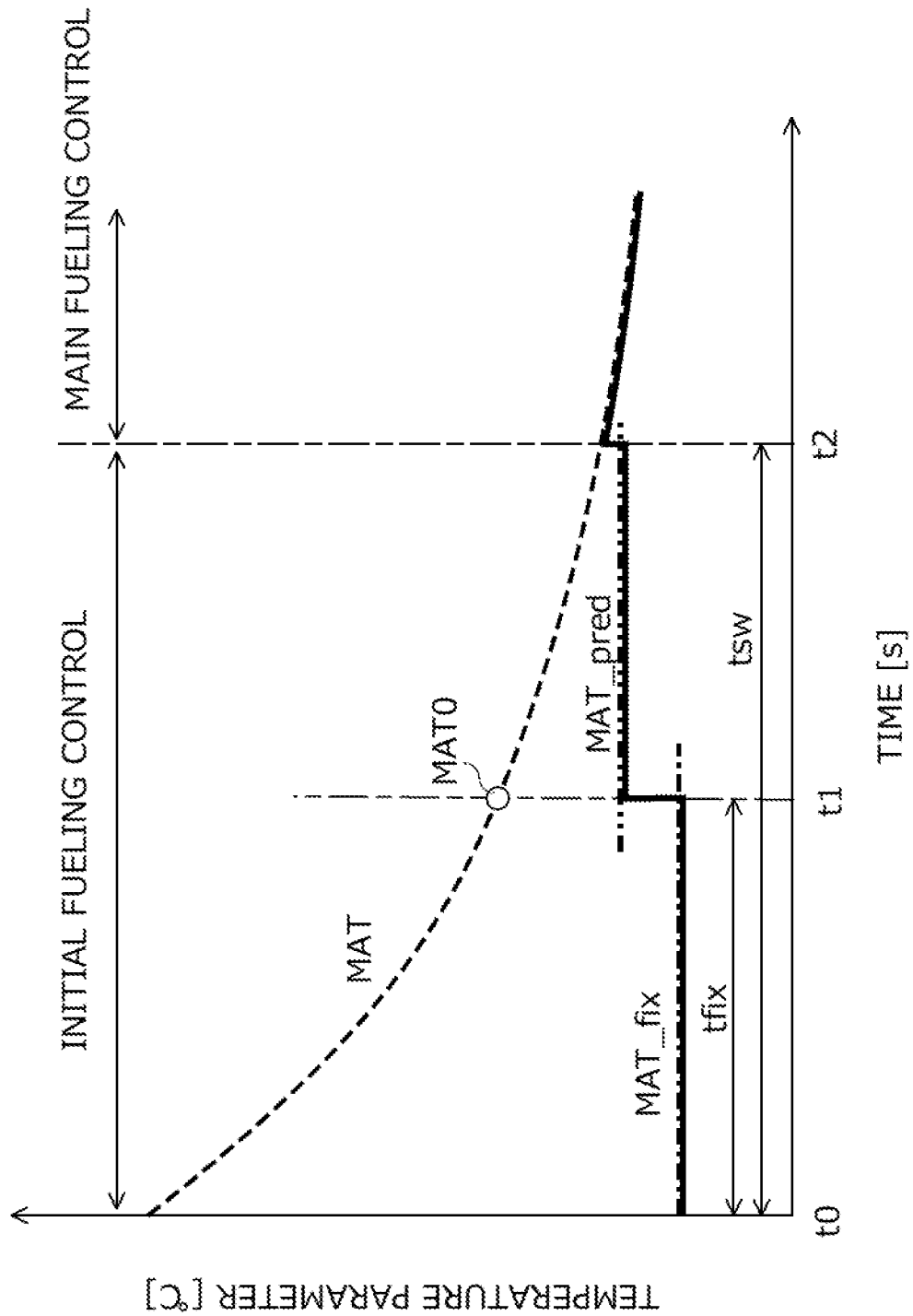
FIG. 4 is a diagram illustrating a change of a temperature parameter immediately after a start of fueling.

Next, a specific sequence of the initial fueling control will be described with reference to FIGS. 4 and 5. FIG. 4 is a diagram illustrating a change of the temperature parameter immediately after the start of fueling. In FIG. 4, the abscissa refers to time, and the ordinate refers to the temperature parameter. In FIG. 4, the timing t0 is set as a fueling start timing, and the sensor-based value MAT of the temperature parameter is indicated by a dotted line. In FIG. 4, a change of the temperature parameter value used as an input in the fueling control executed in the initial fueling control and the main fueling control is indicated by a bold solid line.

At the timing t0, the initial fueling control described below is executed until a switching time tsw described below elapses from the start of the fueling. At the timing t2, after the switching time tsw elapses, the main fueling control described in conjunction with FIG. 3 is executed. In the main fueling control at and after the timing t2, the fueling control based on the sensor-based value MAT of the temperature parameter indicated by the dotted line in FIG. 4 is executed as described above.

Figure 11:
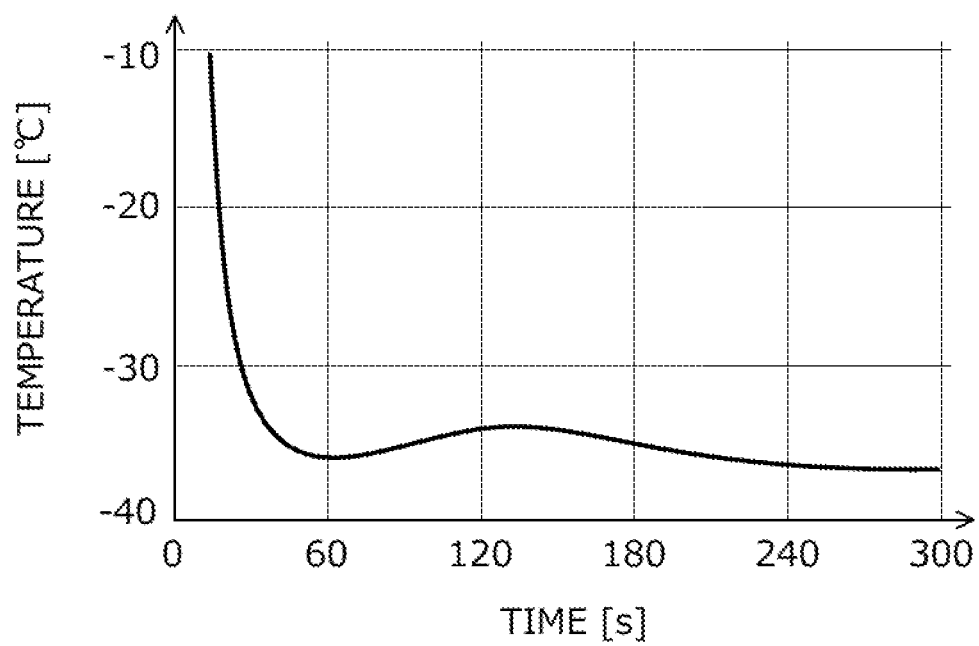
FIG. 11 is a diagram illustrating a temporal change of the temperature detected by the temperature sensor immediately after the start of the fueling.
Figure 12:
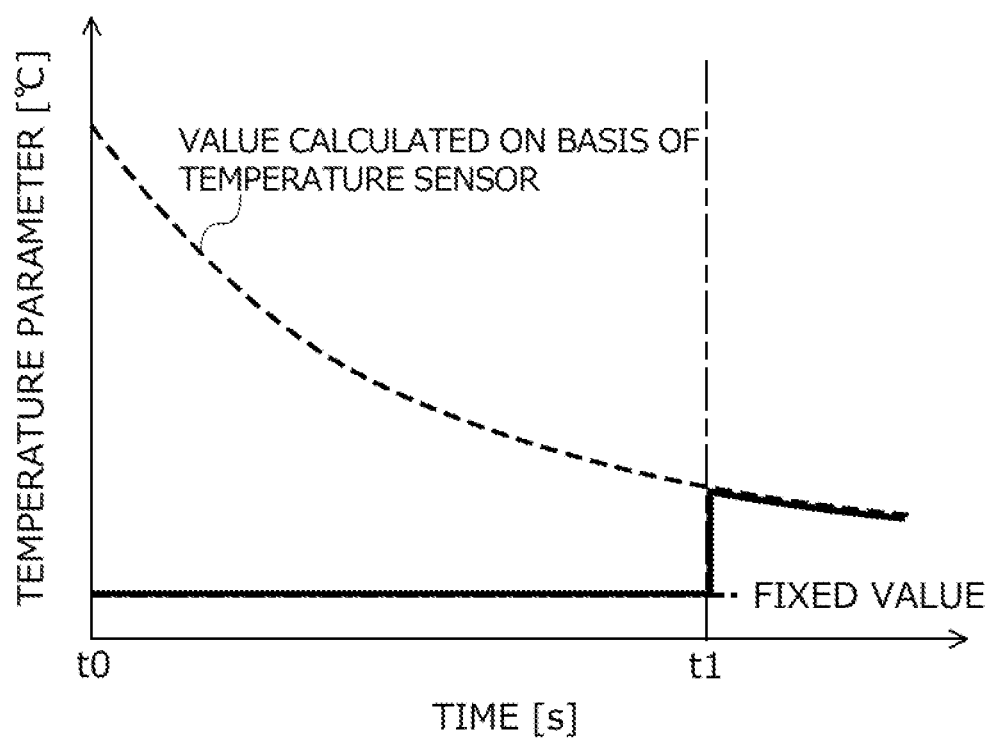
FIG. 12 is a diagram illustrating a change of the temperature parameter immediately after the start of the fueling.

As described above in conjunction with FIG. 11, the detection value of the first station temperature sensor 89 abruptly decreases from the external air temperature to the cooling temperature of the pre-cooler 96 for several tens of seconds from the start of the fueling of the timing t0. For this reason, as indicated by the thin solid line in FIG. 4, the sensor-based value MAT of the temperature parameter also abruptly decreases at the timings t0 to t2. In this regard, in the initial fueling control during the timings t0 to t2, it is difficult to execute the fueling control on the basis of the sensor-based value MAT of the temperature parameter unlike the main fueling control.

Figure 5:
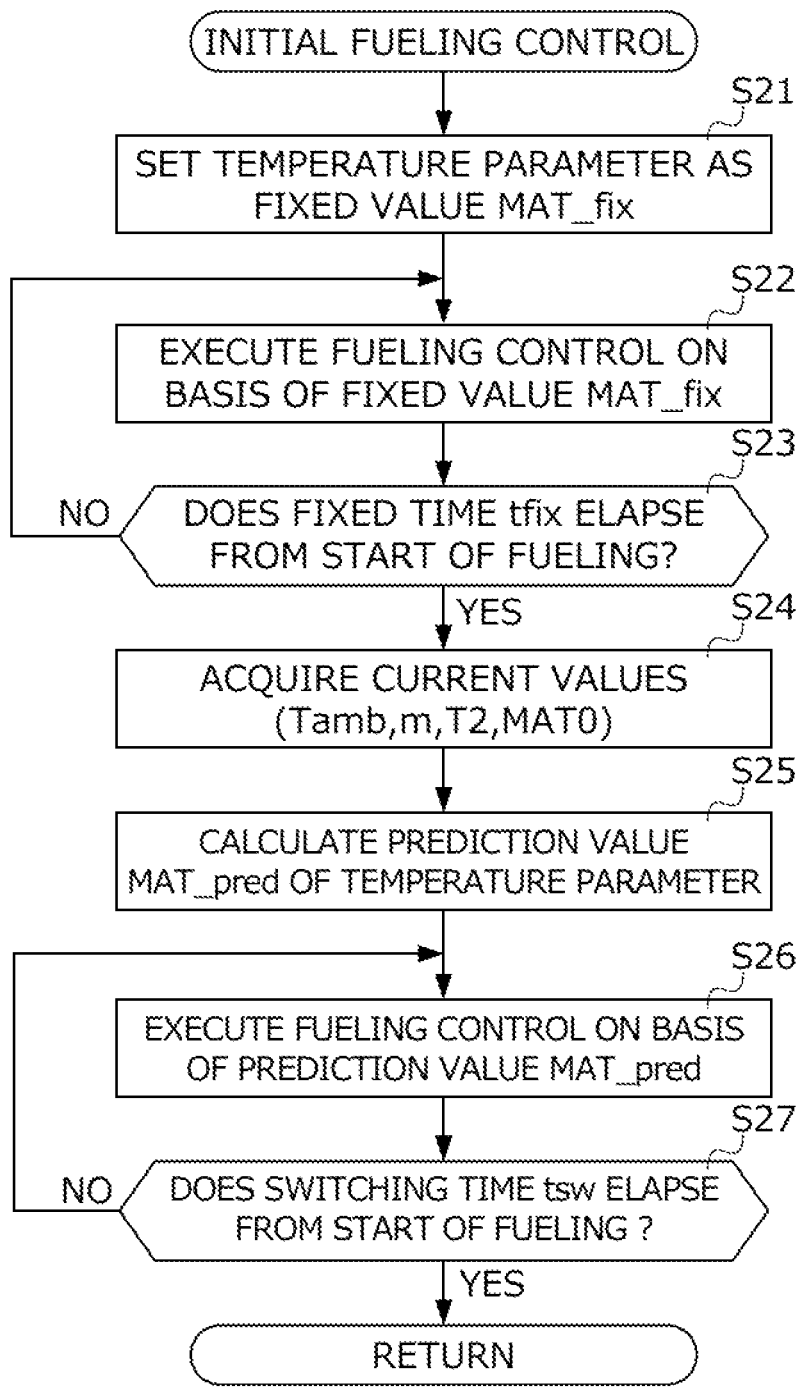
FIG. 5 is a flowchart illustrating a specific sequence of an initial fueling control.

FIG. 5 is a flowchart illustrating a specific sequence of the initial fueling control. First, in S21, the station ECU 95 sets a predetermined fixed value MAT_fix as a value of the temperature parameter, and advances to S22. Here, the fixed value MAT_fix is set to, for example, a cooling temperature of the pre-cooler 96 (specifically, for example, −40° C.). In FIG. 4, this fixed value MAT_fix is indicated by a one-dotted chain line.

Then, in S22, the station ECU 95 executes the fueling control on the basis of the fixed value MAT_fix of the temperature parameter set in S21. More specifically, the station ECU 95 executes the fueling control of S12 to S15 of FIG. 3 by setting the fixed value MAT_fix of the temperature parameter as an input, and then advances to S23.

Then, in S23, the station ECU 95 determines whether or not a predetermined fixed time tfix (specifically, for example, fifteen seconds) elapses from the start of the fueling. If it is determined NO in S23, the station ECU 95 returns to S22, and continuously executes the fueling control again using the fixed value MAT_fix of the temperature parameter. If it is determined YES in S23, that is, if the fixed time tfix elapses from the start of the fueling, the station ECU 95 advances to S24.

Then, in S24, the station ECU 95 acquires the current ambient temperature value Tamb, the current mass flow rate value m, the gas temperature value T2 of the current measurement position Q2, and the initial value MAT0 of the temperature parameter. Here, the ambient temperature value Tamb is acquired by the station ECU 95 on the basis of the detection value of the external air temperature sensor 88. The mass flow rate value m is acquired by the station ECU 95 on the basis of the detection value of the mass flowmeter 85. The gas temperature value T2 is acquired by the station ECU 95 on the basis of the detection value of the second station temperature sensor 86 provided at the measurement position Q2. The initial value MAT0 of the temperature parameter is calculated by acquiring the gas temperature value T1 of the current measurement position Q1 on the basis of the detection value of the first station temperature sensor 89 and applying the mass averaging processing of the formula (1) to this temperature value T1. In FIG. 4, the initial value MAT0 is indicated by a white circle.

Then, in S25, the station ECU 95 calculates a prediction value MAT_pred of the temperature parameter on the basis of a heat capacity value C from the measurement position Q2 to the measurement position Q1, the ambient temperature value Tamb, the current mass flow rate value m, the gas temperature value T2 of the current measurement position Q2, and the initial value MAT0 of the temperature parameter. Here, the prediction value MAT_pred refers to a prediction value of the sensor-based value MAT of the temperature parameter for a case where the hydrogen gas fueling is continuously performed after a prediction time (more specifically, the time obtained by subtracting the fixed time tfix from the switching time tsw described below) elapses from the current timing (that is, when the fixed time tfix elapses from the start of the fueling). In FIG. 4, this prediction value MAT_pred is indicated by a two-dotted chain line. In addition, a value set by performing an experiment in advance is used as the heat capacity value C.

Then, in S26, the station ECU 95 executes the fueling control on the basis of the prediction value MAT_pred of the temperature parameter set in S25. More specifically, the station ECU 95 executes the fueling control of S12 to S15 of FIG. 3 by setting the prediction value MAT_pred of the temperature parameter as an input and then advances to S27.

Then, in S27, the station ECU 95 determines whether or not the switching time tsw (specifically, for example, thirty seconds) set to be longer than the fixed time tfix elapses after the start of the fueling. If it is determined NO in S27, the station ECU 95 returns to S26 and continuously executes the fueling control again using the prediction value MAT_pred of the temperature parameter. If it is determined YES in S27, that is, if the switching time tsw elapses from the start of the fueling, the station ECU 95 terminates the initial fueling control of FIG. 5 and starts the main fueling control of S5 of FIG. 2.

The following effects (1) and (2) are obtained using the gas fueling method according to this embodiment.

(1) In the gas fueling method, the initial fueling control and the main fueling control are performed on the basis of the temperature parameter defined at the measurement position Q1. In the initial fueling control, the ambient temperature, the mass flow rate, and the gas temperature value at the measurement position Q2 in the upstream side of the measurement position Q1 are obtained. The prediction value MAT_pred of the temperature parameter at a prediction time or later for a case where the fueling is continuously performed from the current timing to the prediction time or later is calculated on the basis of the heat capacity value C from the measurement position Q1 to the measurement position Q2, the ambient temperature value Tamb, the mass flow rate value m, the gas temperature value T2, and the initial value MAT0 of the temperature parameter. Furthermore, the initial fueling control is performed on the basis of the prediction value MAT_pred. As a result, for example, even when it is difficult to directly calculate the temperature parameter value using the first station temperature sensor 89 provided in the measurement position Q1 farther than the measurement position Q2 from the pre-cooler 96 from the current timing immediately after the start of the fueling to the prediction time or later, it is possible to calculate the prediction value MAT_pred of the temperature parameter from the current timing to the prediction time or later and perform the initial fueling control on the basis of the prediction value MAT_pred. Therefore, for example, even when the fueling control is switched from the initial fueling control using the prediction value MAT_pred to the main fueling control using the sensor-based value MAT as the temperature parameter value MAT can be directly calculated using the first station temperature sensor 89 after the prediction time, it is possible to reduce a difference between both the values MAT_pred and MAT (refer to FIG. 4). Therefore, it is possible to suppress unnecessary overheating of the hydrogen tank immediately after the start of the fueling.

(2) In the gas fueling method, the main fueling control is performed using the sensor-based value MAT of the temperature parameter calculated on the basis of the detection value of the first station temperature sensor 89 provided in the measurement position Q1 after the prediction time elapses from the start of the fueling, and the initial fueling control is terminated. In the gas fueling method, the measurement position Q1 used to define the temperature parameter is set as a position of the fueling nozzle 92 closest to the fuel cell vehicle V in the middle of the gas flow passage. Therefore, in the gas fueling method, after the prediction time elapses, it is possible to perform the fueling control using the temperature parameter corresponding to an actual temperature of the gas supplied to the hydrogen tank 31 on the basis of the sensor-based value MAT of the temperature parameter calculated from the detection value of the first station temperature sensor 89 provided in the fueling nozzle 92.

In the aforementioned embodiment, a case where the fueling nozzle 92 is defined as the measurement position Q1, and the first station temperature sensor 89 is provided in the measurement position Q1 has been described. However, the invention is not limited thereto. The measurement position Q1 may be set between the fueling nozzle 92 and the joint portion 83. In the aforementioned embodiment, a case where the measurement position Q2 is set between the joint portion 83 and the pre-cooler 96, and the second station temperature sensor 86 is provided in the measurement position Q2 has been described. However, the invention is not limited thereto. The measurement position Q2 may be set in the joint portion 83 or the pre-cooler 96 as long as it is located in the upstream side of the measurement position Q1. In the aforementioned embodiment, a case where the first station temperature sensor 89 and the second station temperature sensor 86 directly detect the temperature of the hydrogen gas has been described. However, the invention is not limited thereto. The first station temperature sensor 89 and the second station temperature sensor 86 may not directly detect the gas temperature. Instead, a temperature of a part relating to the gas temperature (for example, a temperature of the pipe through which the gas flows or a temperature of the refrigerant for cooling the gas in the pre-cooler 96) may be detected.

Second Embodiment

Next, a second embodiment of the invention will be described with reference to the accompanying drawings. A gas fueling method according to this embodiment is different from the gas fueling method of the first embodiment in the specific sequence of the initial fueling control. A specific configuration of the hydrogen fueling system for executing the gas fueling method according to this embodiment is similar to the hydrogen fueling system S of the first embodiment. Therefore, it will not be described repeatedly.

Figure 6:
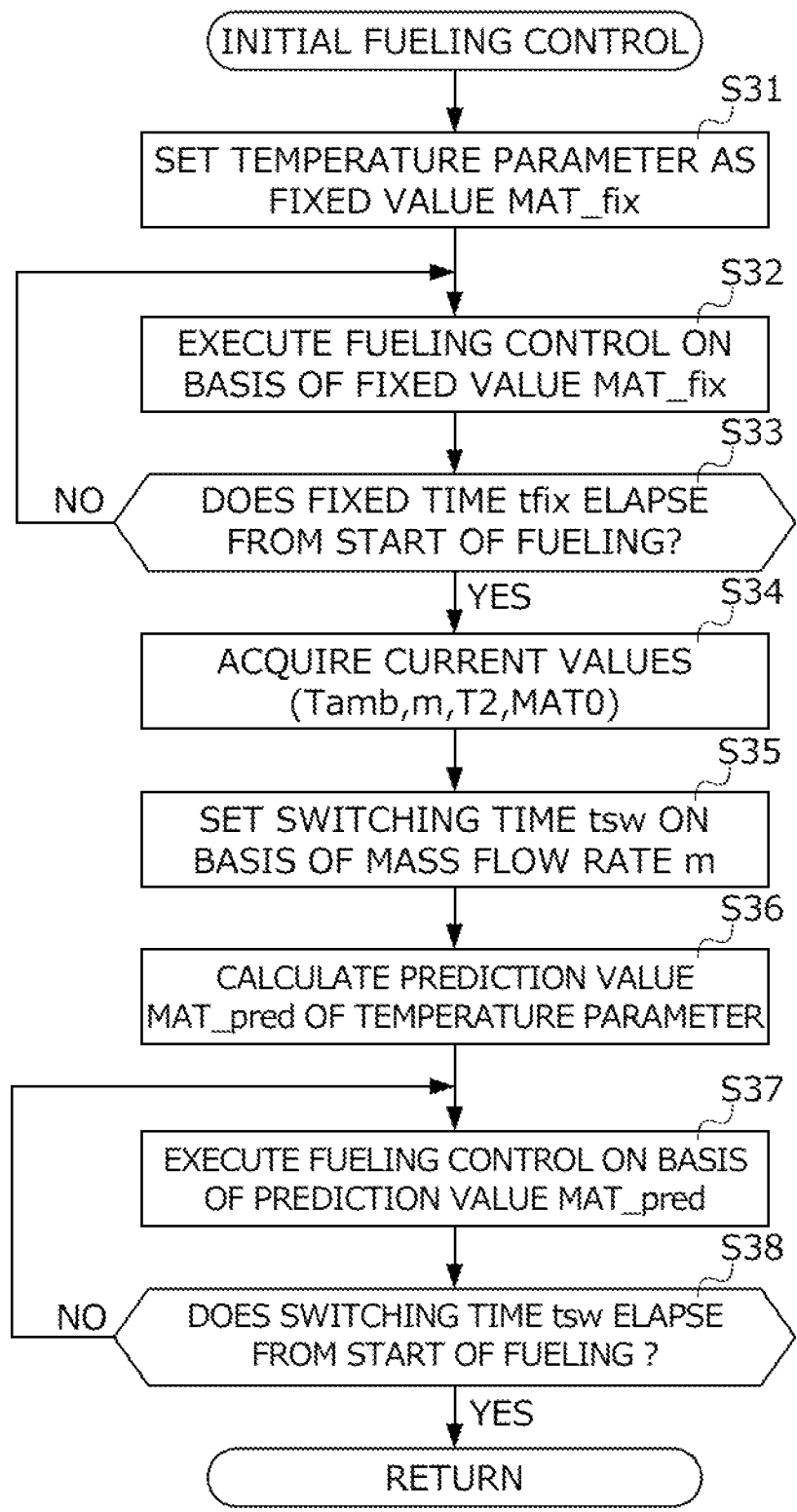
FIG. 6 is a flowchart illustrating a specific sequence of the initial fueling control according to a second embodiment of the invention.

FIG. 6 is a flowchart illustrating a specific sequence of the initial fueling control according to this embodiment. In the initial fueling control of the first embodiment, the switching time tsw at which the initial fueling control is terminated and the main fueling control starts is set as a fixed value. In comparison, the initial fueling control according to this embodiment is different from the initial fueling control of the first embodiment in that the switching time tsw is variable. Note that the processing of S31 to S34 in the flowchart of FIG. 6 is similar to that of S21 to S24 of the flowchart of FIG. 5, and it will not be described repeatedly.

Figure 7:
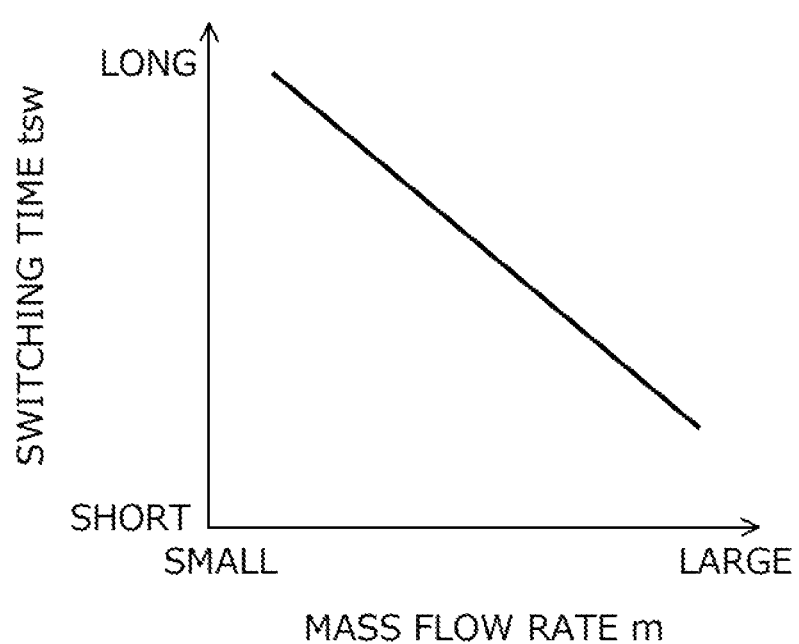
FIG. 7 is an exemplary map for determining a switching time.

In S35, the station ECU 95 sets the switching time tsw on the basis of the mass flow rate value m acquired in S34. More specifically, the station ECU 95 sets the switching time tsw by searching the map of FIG. 7 on the basis of the mass flow rate value m. As illustrated in FIG. 7 the station ECU 95 sets the mass flow rate value m to be lower, and sets the switching time tsw to be longer. This is because it is conceived that, as the mass flow rate of the hydrogen gas decreases, influence of a heat mass of the pipe increases, so that it is difficult to lower the temperature of the hydrogen gas, and a risk of overheating of the hydrogen tank 31 increases during execution of the initial fueling control.

Returning to FIG. 6, in S36, the station ECU 95 calculates the prediction value MAT_pred of the temperature parameter for a case where the hydrogen gas fueling is continuously performed after a prediction time (more specifically, the time obtained by subtracting the fixed time tfix from the switching time tsw set in S35) elapses from the current timing (that is, when the fixed time tfix elapses from the start of the fueling) on the basis of the heat capacity value C, the ambient temperature value Tamb, the current mass flow rate value m, the gas temperature value T2 at the current measurement position Q2, and the initial value MAT0 of the temperature parameter.

Note that the processing of S37 to S38 in the flowchart of FIG. 6 is similar to that of S26 to S27 in the flowchart of FIG. 5, and they will not be described repeatedly.

Using the gas fueling method according to this embodiment, the following effect (3) can be achieved in addition to the aforementioned effects (1) and (2).

(3) In the gas fueling method, the initial fueling control is performed on the basis of the prediction value MAT_pred of the temperature parameter calculated on the basis of the detection value of the second station temperature sensor 86 provided in the measurement position Q2 until the switching time tsw elapses from the start of the fueling. After the switching time tsw elapses, the main fueling control is performed using the sensor-based value MAT of the temperature parameter calculated on the basis of the detection value of the first station temperature sensor 89 provided in the measurement position Q1. In the gas fueling method, the switching time tsw changes depending on the mass flow rate value m, so that the timing for switching from the initial fueling control to the main fueling control can be determined depending on an actual fueling condition.

If the mass flow rate of the hydrogen gas is low, influence of the heat mass of the pipe increases. Therefore, it is conceived that it becomes difficult to decrease the hydrogen gas temperature, and a risk of overheating of the hydrogen tank increases. In this regard, in the gas fueling method, as the mass flow rate value m decreases, the switching time tsw increases in order to delay the fueling control switching timing. As a result, it is possible to switch the fueling control at the timing suitable for an actual fueling condition.

Third Embodiment

Next, a third embodiment of the invention will be described with reference to the accompanying drawings. In the gas fueling method according to this embodiment, a specific sequence of the initial fueling control is different from that of the gas fueling method of the first embodiment. A specific configuration of the hydrogen fueling system for executing the gas fueling method according to this embodiment is similar to that of the hydrogen fueling system S of the first embodiment, and it will not be described repeatedly.

Figure 8:
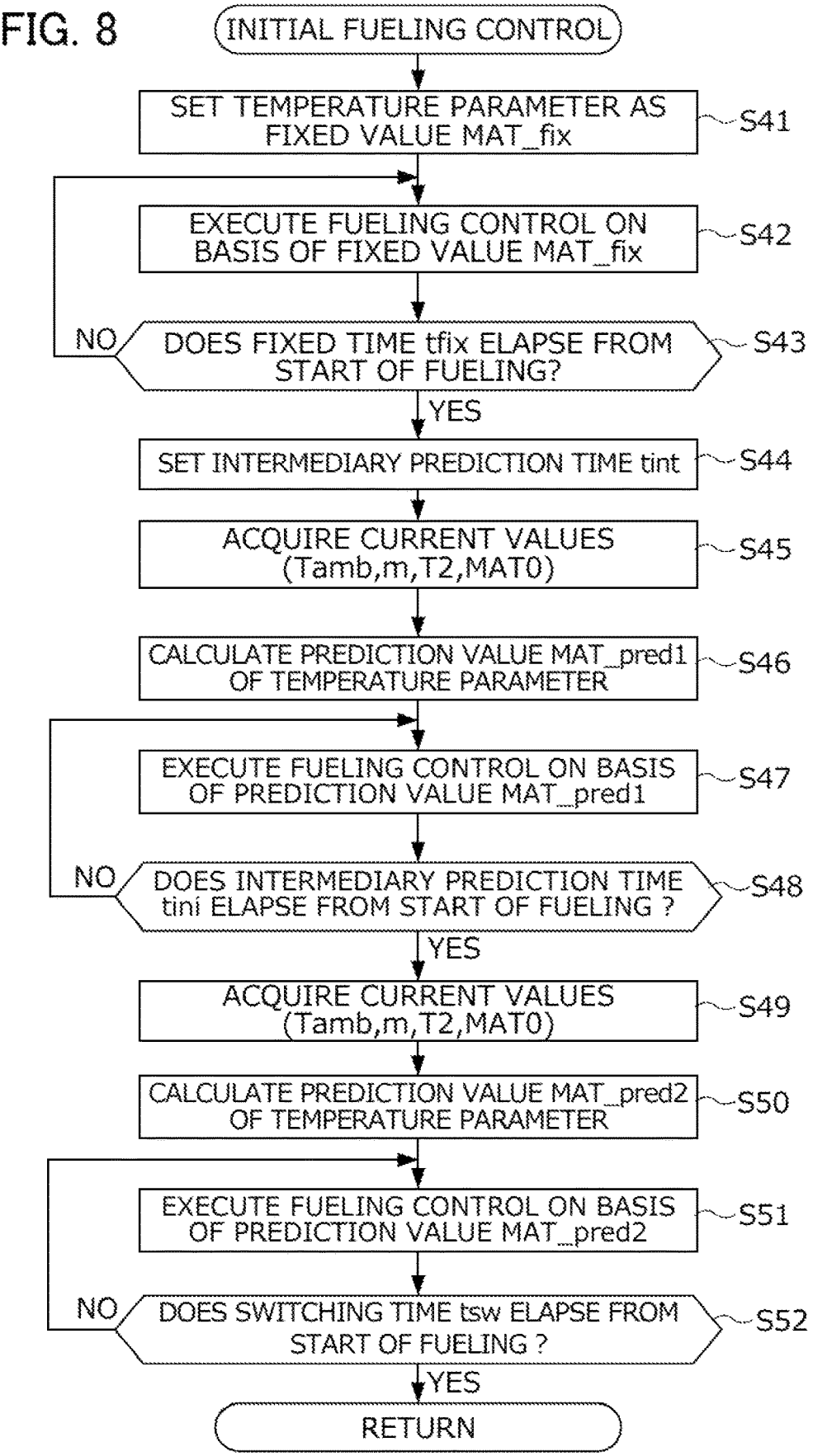
FIG. 8 is a flowchart illustrating a specific sequence of the initial fueling control according to a third embodiment of the invention.

FIG. 8 is a flowchart illustrating a specific sequence of the initial fueling control according to this embodiment. In the initial fueling control of the first embodiment, there is only one chance to calculate the prediction value MAT_pred of the temperature parameter until the switching time tsw elapses from the start of the fueling. In comparison, the initial fueling control according to this embodiment is different from the initial fueling control of the first embodiment in that there are several chances to calculate the prediction value of the temperature parameter until the switching time tsw elapses from the start of the fueling. Note that, in the flowchart of FIG. 8, the processing of S41 to S43 is similar to that of S21 to S23 of the flowchart of FIG. 5, and it will not be described repeatedly.

Figure 9:
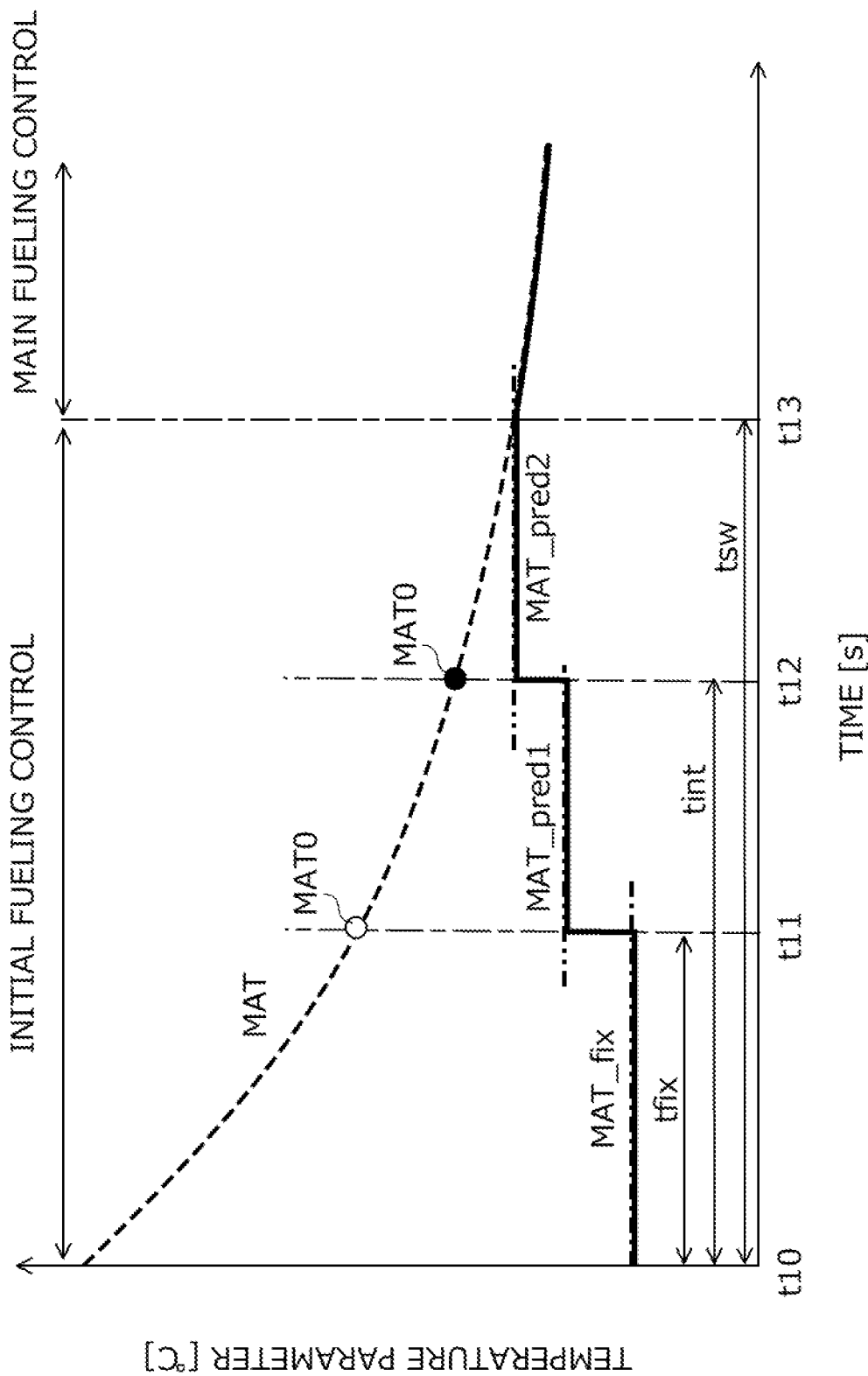
FIG. 9 is a diagram illustrating a change of the temperature parameter immediately after a start of the fueling.

FIG. 9 is a diagram illustrating a change of the temperature parameter immediately after the start of the fueling. In FIG. 9, the abscissa refers to time, and the ordinate refers to the temperature parameter. In FIG. 9, the timing t10 is set as a fueling start timing, and the sensor-based value MAT of the temperature parameter is indicated by a dotted line. In FIG. 9, a change of the temperature parameter value used as an input in the fueling control executed in the initial fueling control and the main fueling control is indicated by a bold solid line.

First, in S44, the station ECU 95 sets an intermediary prediction time tint between the fixed time tfix and the switching time tsw (tfix<tint<tsw).

In S45, the station ECU 95 acquires the current ambient temperature value Tamb, the current mass flow rate value m, the gas temperature value T2 of the current measurement position Q2, and the initial value MAT0 of the temperature parameter. In FIG. 9, the initial value MAT0 acquired in S45 is indicated by a white circle.

Then, in S46, the station ECU 95 calculates a prediction value MAT_pred1 of the temperature parameter on the basis of the heat capacity value C, the ambient temperature value Tamb, the current mass flow rate value m, the gas temperature value T2 at the current measurement position Q2, and the initial value MAT0 of the temperature parameter. Here, the prediction value MAT_pred1 refers to a prediction value of the sensor-based value MAT of the temperature parameter for a case where the hydrogen gas fueling is continuously performed after a prediction time (more specifically, the time obtained by subtracting the fixed time tfix from the intermediary prediction time tint) elapses from the current timing (that is, when the fixed time tfix elapses from the start of the fueling, i.e., at the timing t11 in FIG. 9). In FIG. 9, this prediction value MAT_pred1 is indicated by a two-dotted chain line.

Then, in S47, the station ECU 95 executes the fueling control on the basis of the prediction value MAT_pred1 of the temperature parameter set in S46. More specifically, the station ECU 95 executes the fueling control similar to that of S12 to S15 of FIG. 3 by setting the prediction value MAT_pred1 of the temperature parameter as an input, and then advances to S48.

Then, in S48, the station ECU 95 determines whether or not the intermediary prediction time tint elapses from the start of the fueling. If it is determined NO in S48, the station ECU 95 returns to S47, and continuously executes the fueling control using the prediction value MAT_pred1 of the temperature parameter again. If it is determined YES in S48, that is, when the intermediary prediction time tint elapses from the start of the fueling (at and after the timing t12 in FIG. 9), the station ECU 95 advances to S49.

Then, in S49, the station ECU 95 acquires the current ambient temperature value Tamb, the current mass flow rate value m, the gas temperature value T2 at the current measurement position Q2, and the initial value MAT0 of the temperature parameter. In FIG. 9, the initial value MAT0 acquired in S49 is indicated by a black circle.

Then, in S50, the station ECU 95 calculates a prediction value MAT_pred2 of the temperature parameter on the basis of the heat capacity value C, the ambient temperature value Tamb, the current mass flow rate value m, the gas temperature value T2 of the current measurement position Q2, and the initial value MAT0 of the temperature parameter. Here, the prediction value MAT_pred2 refers to a prediction value of the sensor-based value MAT of the temperature parameter for a case where the hydrogen gas fueling is continuously performed after a prediction time (more specifically, the time obtained by subtracting the intermediary prediction time tint from the switching time tsw) elapses from the current timing (that is, when the intermediary prediction time tint elapses from the start of the fueling). In FIG. 9, this prediction value MAT_pred2 is indicated by a two-dotted chain line.

Then, in S51, the station ECU 95 executes the fueling control on the basis of the prediction value MAT_pred2 of the temperature parameter set in S50. More specifically, the station ECU 95 executes the fueling control similar to that of S12 to S15 of FIG. 3 by setting the prediction value MAT_pred2 of the temperature parameter as an input, and then advances to S52.

Then, in S52, the station ECU 95 determines whether or not the switching time tsw elapses from the start of the fueling. If it is determined NO in S52, the station ECU 95 returns to S51 and continuously executes the fueling control using the prediction value MAT_pred2 of the temperature parameter again. If it is determined YES in S52, that is, after the switching time tsw elapses from the start of the fueling (that is, at and after the timing t13 in FIG. 9), the station ECU 95 terminates the initial fueling control of FIG. 8 and starts the main fueling control of S5 of FIG. 2.

Note that, while a case where there are two chances to calculate the prediction value of the temperature parameter until the switching time tsw elapses from the start of the fueling has been described in this embodiment, the invention is not limited thereto. There may be three or more chances to calculate the prediction value of the temperature parameter.

Using the gas fueling method according to this embodiment, the following effect (4) can be achieved in addition to the effects (1) and (2) described above.

(4) In the gas fueling method, there are two chances to calculate the prediction value of the temperature parameter until the switching time tsw elapses from the start of the fueling. As a result, it is possible to approximate the prediction value of the temperature to a suitable value in a stepwise manner. Therefore, it is possible to further suppress overheating of the hydrogen tank 31 immediately after the start of the fueling.

Fourth Embodiment

Next, a fourth embodiment of the invention will be described with reference to the accompanying drawings. In the gas fueling method according to this embodiment, a position of the temperature sensor used to perform the fueling control is different from that of the gas fueling method of the first embodiment.

Figure 10:
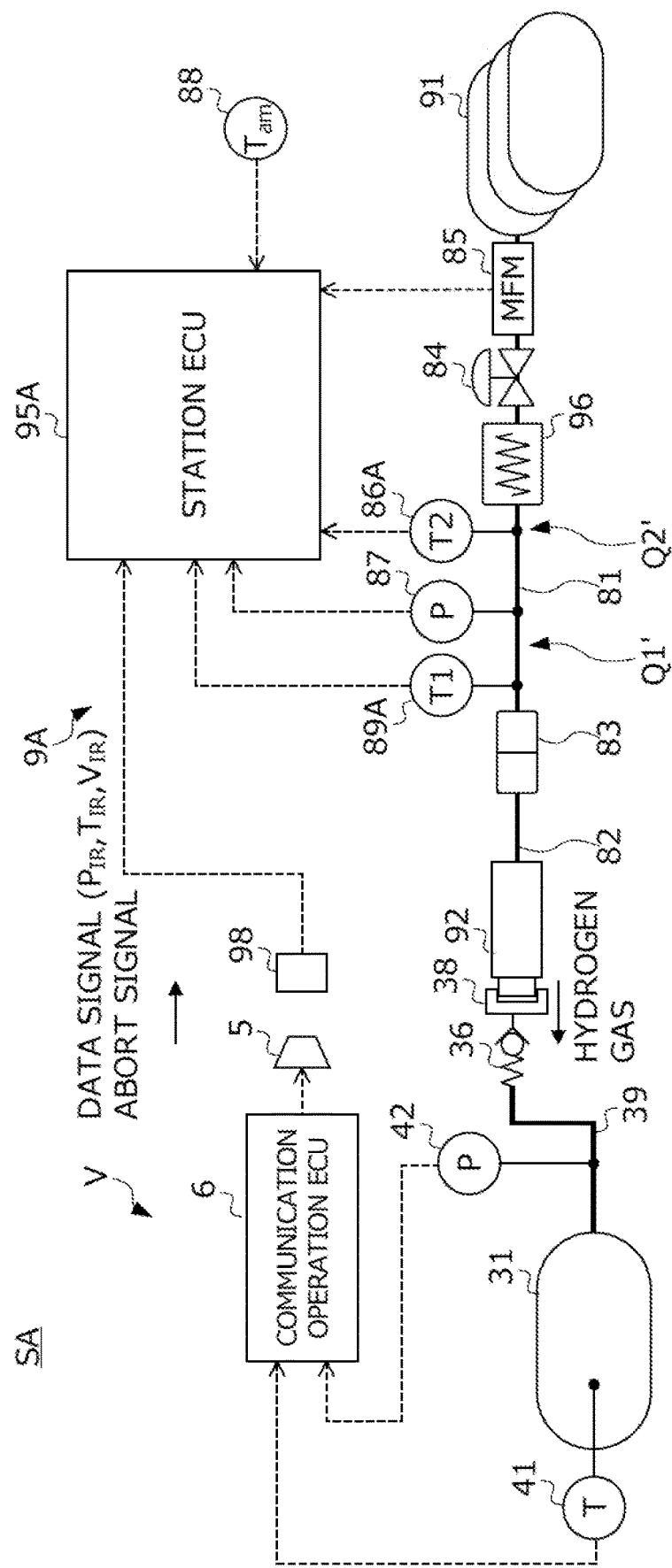
FIG. 10 is a diagram illustrating a configuration of a hydrogen fueling system based on a gas fueling method according to a fourth embodiment of the invention.

FIG. 10 is a diagram illustrating a configuration of the hydrogen fueling system SA to which the gas fueling method according to this embodiment is applied. In the following description of the hydrogen fueling system SA, like reference numerals denote like elements as in the hydrogen fueling system S of the first embodiment, and they will not be described repeatedly. As described above, a configuration of the station 9A of the hydrogen fueling system SA is different from that of the hydrogen fueling system S of the first embodiment. More specifically, the positions of the first station temperature sensor 89A and the second station temperature sensor 86A are different.

The first station temperature sensor 89A is provided in a measurement position Q1' set in the joint portion 83 or between the joint portion 83 and the pre-cooler 96 in the middle of the station pipe 81. FIG. 10 illustrates a case where the first station temperature sensor 89A is provided in the vicinity of the joint portion 83 between the joint portion 83 and the pre-cooler 96. However, the invention is not limited thereto. The first station temperature sensor 89A transmits a signal corresponding to the hydrogen gas temperature at this measurement position Q1' to the station ECU 95A. The gas temperature value of the measurement position Q1' is acquired by the station ECU 95A on the basis of the detection value of the first station temperature sensor 89A.

The second station temperature sensor 86A is provided in a measurement position Q2' set in the upstream side of the measurement position Q1' in the middle of the station pipe 81. More specifically, the second station temperature sensor 86A is provided in the measurement position Q2' set in the pre-cooler 96 or between the measurement position Q1' and the pre-cooler 96 in the middle of the station pipe 81 to transmit a signal corresponding to the hydrogen gas temperature of the measurement position Q2' to the station ECU 95A. FIG. 10 illustrates a case where the second station temperature sensor 86A is provided in the vicinity of the pre-cooler 96 between the measurement position Q' and the pre-cooler 96. However, the invention is not limited thereto. The gas temperature value of the measurement position Q2' is acquired by the station ECU 95A on the basis of the detection value of the second station temperature sensor 86A. As described below, the station ECU 95A may estimate the gas temperature value of the measurement position Q1' on the basis of the detection value of the second station temperature sensor 86A provided in the measurement position Q2' in the upstream side of the measurement position Q1'.

The gas fueling method according to this embodiment is different from the gas fueling method of the first embodiment only in the measurement position Q1' where the first station temperature sensor 89A is provided and the measurement position Q2' where the second station temperature sensor 86A is provided as described above. However, the specific sequence of the main fueling control or the initial fueling control according to this embodiment is similar to that of first embodiment. Therefore, the specific sequence of the gas fueling method will not be described repeatedly.

Using the gas fueling method according to this embodiment, the following effect (4) can be achieved in addition to the aforementioned effects (1) and (2).

(4) In the gas fueling method, the measurement position Q1' used to define the temperature parameter is set between the joint portion 83 and the pre-cooler 96 in the middle of the gas flow passage. In many stations of the related art, the temperature sensor is provided between the joint portion 83 and the pre-cooler 96. Therefore, it is possible to apply the aforementioned gas fueling method just by adding a small equipment change to the existing station by setting the measurement position Q1' in such a location.

While the embodiments of the invention have been described, they are not intended to limit the scope of the invention. Detailed configurations may be suitably changed without departing from the spirit and scope of the invention.

What is claimed is:

1. A gas fueling method between a gas supply source and a tank of a mobile object coupled to each other with a gas flow passage provided with a cooling device and a flow rate regulator to perform a fueling control on the basis of a temperature parameter at a first predetermined position of the gas flow passage, the gas fueling method comprising:

a process for acquiring an ambient temperature, a mass flow rate of a gas flowing through the gas flow passage, and a gas temperature value or a temperature value relating to the gas at a second predetermined position located on an upstream side of the first predetermined position in the middle of the gas flow passage; and a process for predicting a value of the temperature parameter after a prediction time for a case where gas fueling is continuously performed from a current timing to the prediction time or later on the basis of a heat capacity from the first predetermined position to the second predetermined position that is separated from the first predetermined position by a certain distance, the acquired ambient temperature value, the acquired mass flow rate value, and the acquired temperature value, wherein a fueling control is performed on the basis of the prediction value of the temperature parameter, and wherein the gas flow passage further comprises a joint portion that couples the gas flow passage at the first predetermined position to the gas flow passage at the second predetermined position, and the second predetermined position is placed across the joint portion from the first predetermined position.

2. The gas fueling method according to claim 1, further comprising a process for calculating a value of the temperature parameter on the basis of a detection value of a first gas temperature sensor provided in the first predetermined position and the acquired mass flow rate value after the prediction time elapses, wherein a fueling control is performed on the basis of the prediction value of the temperature parameter until the prediction time elapses, a fueling control is performed on the basis of the calculation value of the temperature parameter after the prediction time elapses, and the prediction time changes depending on the acquired mass flow rate value.

3. The gas fueling method according to claim 2, wherein the prediction time is set to be longer in a case where the acquired mass flow rate value is lower than a predetermined value, compared to a case where the acquired mass flow rate value is higher than the predetermined value.

4. The gas fueling method according to claim 1, wherein the gas flow passage has a first pipe extending from the supply source, a second pipe extending from a nozzle portion coupled to a receptacle of the mobile object, and a joint portion that couples the first and second pipes to each other, the cooling device is provided in the first pipe, the first predetermined position is set in the nozzle portion or between the nozzle portion and the joint portion, and the second predetermined position is set in the joint portion, in the cooling device, or between the joint portion and the cooling device.

5. The gas fueling method according to claim 2, wherein the gas flow passage has a first pipe extending from the supply source, a second pipe extending from a nozzle portion coupled to a receptacle of the mobile object, and a joint portion that couples the first and second pipes to each other, the cooling device is provided in the first pipe, the first predetermined position is set in the nozzle portion or between the nozzle portion and the joint portion, and the second predetermined position is set in the joint portion, in the cooling device, or between the joint portion and the cooling device.

6. The gas fueling method according to claim 3, wherein the gas flow passage has a first pipe extending from the supply source, a second pipe extending from a nozzle portion coupled to a receptacle of the mobile object, and a joint portion that couples the first and second pipes to each other, the cooling device is provided in the first pipe, the first predetermined position is set in the nozzle portion or between the nozzle portion and the joint portion, and the second predetermined position is set in the joint portion, in the cooling device, or between the joint portion and the cooling device.

7. The gas fueling method according to claim 1, wherein a first temperature sensor is disposed at the first predetermined position and configured to detect a gas temperature, and a second temperature sensor is disposed at the second predetermined position and configured to detect a gas temperature, and wherein the temperature parameter at the first predetermined position is obtained based on the gas temperature detected by the first temperature sensor, and the gas temperature value or the temperature value relating to the gas at the second predetermined position is obtained based on the gas temperature detected by the second temperature sensor.

* * * * *